(12) United States Patent
Yaworski (10) Patent No.: US 7,901,243 B1
(45) Date of Patent: Mar. 8, 2011

(54) METHODS AND SYSTEMS FOR FORMING A PROTECTED DISCONNECTABLE JOINT ASSEMBLY

(75) Inventor: Harry George Yaworski, Apex, NC (US)

(73) Assignee: Tyco Electronics Corporation, Berwyn, PA (US)

( * ) Notice: Subject to any disclaimer, the term of this patent is extended or adjusted under 35 U.S.C. 154(b) by 0 days.

(21) Appl. No.: 12/750,085

(22) Filed: Mar. 30, 2010

(51) Int. Cl.
*H01R 13/52* (2006.01)

(52) U.S. Cl. ........................................... 439/523
(58) Field of Classification Search .............. 439/523, 439/502, 282, 816, 885; 174/84 R
See application file for complete search history.

(56) References Cited

U.S. PATENT DOCUMENTS

| | | | | | |
|---|---|---|---|---|---|
| 2,748,452 | A | * | 6/1956 | Pierce | 29/865 |
| 2,811,705 | A | * | 10/1957 | Schumacher | 439/881 |
| 2,944,330 | A | * | 7/1960 | Grant | 428/572 |
| 3,417,362 | A | * | 12/1968 | Reynolds | 439/77 |
| 3,713,079 | A | * | 1/1973 | Dechelette | 439/749 |
| 3,764,955 | A | * | 10/1973 | Ward | 439/377 |
| 3,801,730 | A | | 4/1974 | Nakata et al. | |
| 4,037,915 | A | * | 7/1977 | Cabaud | 439/858 |
| 4,120,558 | A | * | 10/1978 | Seidler | 439/876 |
| 4,384,757 | A | * | 5/1983 | Andrews et al. | 439/736 |
| 4,616,416 | A | * | 10/1986 | Cabaud | 29/884 |
| 4,712,850 | A | * | 12/1987 | Seidler | 439/861 |
| 4,846,734 | A | * | 7/1989 | Lytle | 439/637 |
| 4,996,766 | A | * | 3/1991 | Piorunneck et al. | 29/842 |
| 5,060,372 | A | | 10/1991 | Capp et al. | 29/883 |
| 5,173,055 | A | * | 12/1992 | Grabbe | 439/66 |
| 5,230,640 | A | | 7/1993 | Tardif | |
| 5,407,365 | A | * | 4/1995 | Lin | 439/636 |

(Continued)

OTHER PUBLICATIONS

"Cover Assemblies for Cables and Electrical Connections and Methods for Making and Using the Same," U.S. Appl. No. 12/506,856, filed Jul. 21, 2009, 26 pages.

(Continued)

*Primary Examiner* — T C Patel
*Assistant Examiner* — Vladimir Imas
(74) *Attorney, Agent, or Firm* — Myers Bigel Sibley & Sajovec, P.A.

(57) ABSTRACT

A method for forming a protected disconnectable joint assembly includes providing a disconnectable joint assembly. The disconnectable joint assembly includes: an electrical transmission power cable including a conductor and a cable insulation layer covering the conductor, the conductor having a terminal end; an electrically conductive cable connector affixed to the terminal end of the power cable and having a connector coupling portion; a busbar including an electrically conductive busbar body, a busbar coupling portion extending from the busbar body, and a busbar insulation layer covering the busbar body; and a disconnectable coupling mechanism mechanically securing the cable coupling portion to the busbar coupling portion to provide a joint between the cable and the busbar. The disconnectable coupling mechanism is selectively operable to disconnect the cable connector from the busbar without severing the cable. The method further includes: providing a joint cover assembly including a tubular, elastomeric cold-shrinkable sleeve body; maintaining the joint cover assembly in an expanded state using a removable holdout device mounted within the sleeve body; mounting the joint cover assembly on the holdout over the joint between the cable and the busbar; and thereafter removing the holdout device from the joint cover assembly to release the sleeve body to contract onto the disconnectable joint assembly such that the sleeve body circumferentially surrounds the joint between the cable and the busbar, overlaps portions of the cable insulation layer and the busbar insulation layer adjacent the joint, and applies a persistent radially compressive load on the cable insulation layer and the busbar insulation layer.

20 Claims, 7 Drawing Sheets

U.S. PATENT DOCUMENTS

| | | | |
|---|---|---|---|
| 5,551,883 A * | 9/1996 | Davis | 439/65 |
| 5,788,544 A * | 8/1998 | Drekmeier et al. | 439/885 |
| 5,938,039 A * | 8/1999 | Liu | 206/717 |
| 6,139,377 A * | 10/2000 | Chen | 439/885 |
| 6,364,677 B1 | 4/2002 | Nysveen et al. | |
| 6,520,800 B1 | 2/2003 | Michelbach et al. | |
| 6,855,013 B2 * | 2/2005 | Chiang et al. | 439/862 |
| 7,014,477 B2 * | 3/2006 | Tsai | 439/71 |
| 7,072,188 B2 | 7/2006 | Janisch | |
| 7,182,617 B1 | 2/2007 | Cairns et al. | |
| 7,264,494 B2 | 9/2007 | Kennedy et al. | |
| 7,413,476 B2 * | 8/2008 | Ma | 439/637 |
| 7,431,599 B2 | 10/2008 | Luzzi | |
| 7,476,114 B1 | 1/2009 | Contreras | |
| 7,544,104 B2 * | 6/2009 | Fan et al. | 439/722 |
| 7,708,608 B2 * | 5/2010 | Soh | 439/862 |
| 7,837,522 B1 * | 11/2010 | Hoover et al. | 439/876 |
| 2003/0207620 A1 | 11/2003 | Haas et al. | |
| 2003/0220025 A1 * | 11/2003 | Peng et al. | 439/885 |
| 2007/0293087 A1 | 12/2007 | Kennedy et al. | |
| 2007/0293100 A1 * | 12/2007 | Jakob et al. | 439/816 |
| 2008/0160839 A1 * | 7/2008 | Fan et al. | 439/722 |
| 2010/0178809 A1 * | 7/2010 | Tsai | 439/660 |

OTHER PUBLICATIONS

"Methods and Kits for Covering Electrical Cables and Connections," U.S. Appl. No. 12/572,875, filed Oct. 2, 2009, 26 pages.

"CSJA In-line Cold Shrinkable Joints for 1/C Shielded Power Cables (15-35kV)" Tyco Electronics, 2006/2007, 2 pages.

"CSJA Cold Shrinkable 'All-In-One' Straight Joint for Polymeric Insulated Cables Up to 42 kV" Tyco Electronics, EPP 1348 Jul. 2007, 4 pages.

"RSTI Screened, separable connection system 631 A up to 24 kV" Tyco Electronics Raychem GmbH, Energy Division, EPP 0800 Jun. 2004, 6 pages.

"RSTI Screened, separable connection system 630 A up to 36 (42) kV" Tyco Electronics, EPP 0998 Dec. 2003, 4 pages.

\* cited by examiner

METHODS AND SYSTEMS FOR FORMING A PROTECTED DISCONNECTABLE JOINT ASSEMBLY

FIELD OF THE INVENTION

The present invention relates to electrical cables and connections and, more particularly, to protective covers for disconnectable joints.

BACKGROUND OF THE INVENTION

Disconnectable joint busbars are commonly used in electrical power transmission networks in urban environments. The busbar includes a body with two or more posts or lugs extending therefrom and an electrical insulation layer covering the body. Electrical power cables to be spliced are provided with a cable termination lug or connector. Each cable termination lug is disconnectably and reconnectably secured to a respective busbar lug by a bolt or the like, for example.

Disconnectable joint assemblies as described above are useful in urban network applications where a utility may need the ability to disconnect a joint to sectionalize a piece of cable for repair, for example. By way of example, a bad or damaged cable may be disconnected from the busbar to remove the cable from the circuit in a quick and efficient manner, and then reconnected to the busbar after the repair is made.

In order to protect the joint, cable, busbar and cable terminal lug from the environment (e.g., moisture) and to protect technicians from the electrically energized components, joint sleeve systems are employed. Typically, the joint sleeve system includes a relatively stiff push-on joint sleeve formed of EPDM rubber and a plurality of push-on cable adapters having a given outer diameter and different inner diameters. The joint sleeve has an effectively fixed inner diameter and a cable adapter of appropriate outer diameter is selected to build up the outer diameter of the cable to suitably fit the inner diameter of the joint sleeve. The cable adapter is forcibly pushed onto the cable and the joint sleeve is forcibly pushed onto the cable adapter and the busbar to span the joint and overlap the insulation layers of the cable and the busbar.

Disconnectable joint sleeve systems as described can suffer several significant drawbacks. Because the push-on cable adapters each have a limited cable diameter use range, multiple different sizes of cable adapters are required to cover many intended use ranges. The cable adapters may be difficult to push on and may require holding collars to prevent them from sliding out of position when the joint sleeve is pushed over them. The completed joint sleeve assembly may be long and bulky, a particular drawback when used in congested urban manholes, for example. Because the joint assembly is relatively still, it may lose its seal with the cable adapter or the busbar when the cables are bent or moved.

SUMMARY OF THE INVENTION

According to method embodiments of the present invention, a method for forming a protected disconnectable joint assembly includes providing a disconnectable joint assembly. The disconnectable joint assembly includes: an electrical transmission power cable including a conductor and a cable insulation layer covering the conductor, the conductor having a terminal end; an electrically conductive cable connector affixed to the terminal end of the power cable and having a connector coupling portion; a busbar including an electrically conductive busbar body, a busbar coupling portion extending from the busbar body, and a busbar insulation layer covering the busbar body; and a disconnectable coupling mechanism mechanically securing the cable coupling portion to the busbar coupling portion to provide a joint between the cable and the busbar. The disconnectable coupling mechanism is selectively operable to disconnect the cable connector from the busbar without severing the cable. The method further includes: providing a joint cover assembly including a tubular, elastomeric cold-shrinkable sleeve body; maintaining the joint cover assembly in an expanded state using a removable holdout device mounted within the sleeve body; mounting the joint cover assembly on the holdout over the joint between the cable and the busbar; and thereafter removing the holdout device from the joint cover assembly to release the sleeve body to contract onto the disconnectable joint assembly such that the sleeve body circumferentially surrounds the joint between the cable and the busbar, overlaps portions of the cable insulation layer and the busbar insulation layer adjacent the joint, and applies a persistent radially compressive load on the cable insulation layer and the busbar insulation layer.

According to embodiments of the present invention, a system to form a protected disconnectable joint assembly using an electrical transmission power cable including a conductor and a cable insulation layer covering the conductor, the conductor having a terminal end, and an electrically conductive cable connector affixed to the terminal end of the power cable and having a connector coupling portion, includes a busbar, a disconnectable coupling mechanism, a joint cover assembly and a holdout. The busbar includes an electrically conductive busbar body, a busbar coupling portion extending from the busbar body, and a busbar insulation layer covering the busbar body. The disconnectable coupling mechanism is provided to mechanically secure the cable coupling portion to the busbar coupling portion to provide a joint between the cable and the busbar and thereby form a disconnectable joint assembly. The disconnectable coupling mechanism is selectively operable to disconnect the cable connector from the busbar without severing the cable. The joint cover assembly includes a tubular, elastomeric cold-shrinkable sleeve body, wherein the joint cover assembly is configured to be mounted on the disconnectable joint assembly such that the sleeve body circumferentially surrounds the joint between the cable and the busbar, overlaps portions of the cable insulation layer and the busbar insulation layer adjacent the joint, and applies a persistent radially compressive load on the cable insulation layer and the busbar insulation layer. The removable holdout is mounted within the sleeve body. The holdout maintains the joint cover assembly in an expanded state and, when removed, permits the sleeve body to contract to a contracted state about the joint.

According to method embodiments of the present invention, a method for forming a protected disconnectable joint assembly includes providing a disconnectable joint assembly. The disconnectable joint assembly includes: an electrical transmission power cable including a conductor and a cable insulation layer covering the conductor, the conductor having a terminal end; an electrically conductive cable connector affixed to the terminal end of the power cable and having a connector coupling portion; a busbar including an electrically conductive busbar body, a busbar coupling portion extending from the busbar body, and a busbar insulation layer covering the busbar body; and a disconnectable coupling mechanism mechanically securing the cable coupling portion to the busbar coupling portion to provide a joint between the cable and the busbar. The disconnectable coupling mechanism is selectively operable to disconnect the cable connector from the busbar without severing the cable. The method further includes: providing a joint cover assembly including a tubular, elastomeric cold-shrinkable sleeve body having a Modulus at 100 percent elongation in the range of from about 0.4 to 0.7 MPa; and mounting the joint cover assembly on the disconnectable joint assembly, including mounting the sleeve body on the cable and the busbar such that the sleeve body circumferentially surrounds the joint between the cable and the busbar, overlaps portions of the cable insulation layer and the busbar insulation layer adjacent the joint, and applies a persistent radially compressive load on the cable insulation layer and the busbar insulation layer.

Further features, advantages and details of the present invention will be appreciated by those of ordinary skill in the art from a reading of the figures and the detailed description of the preferred embodiments that follow, such description being merely illustrative of the present invention.

DETAILED DESCRIPTION OF EMBODIMENTS OF THE INVENTION

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout. As used herein the term "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The Modulus at 100 percent elongation (M100) values as recited herein are the values as determined in accordance with ASTM Standard D412-06 at 500 mm/minute. M100 values may also be commonly referred to or designated as the $M_{100}$ or M-100 value.

Figure 1:
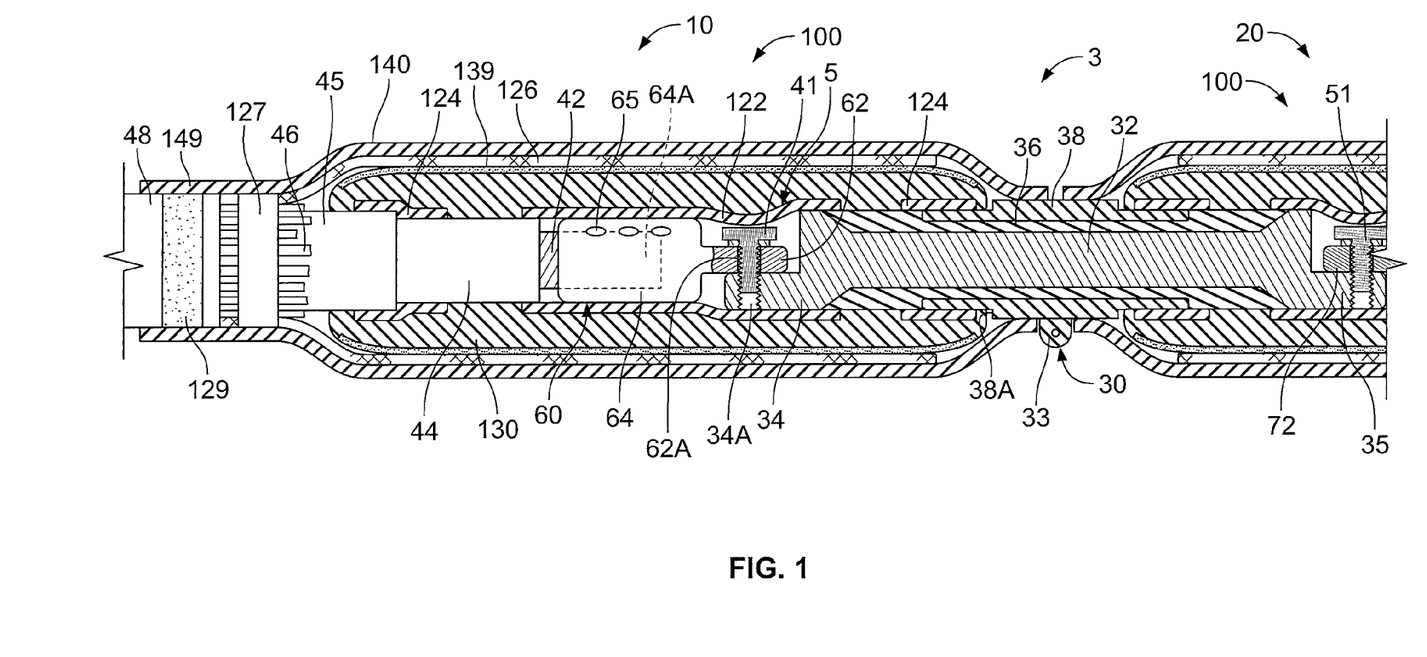
FIG. 1 is a cross-sectional view of protected disconnectable joint assembly including a terminated power cable, a disconnectable busbar and a disconnectable joint cover assembly according to embodiments of the present invention, taken along the line 1-1 of FIG. 7.
Figure 2:
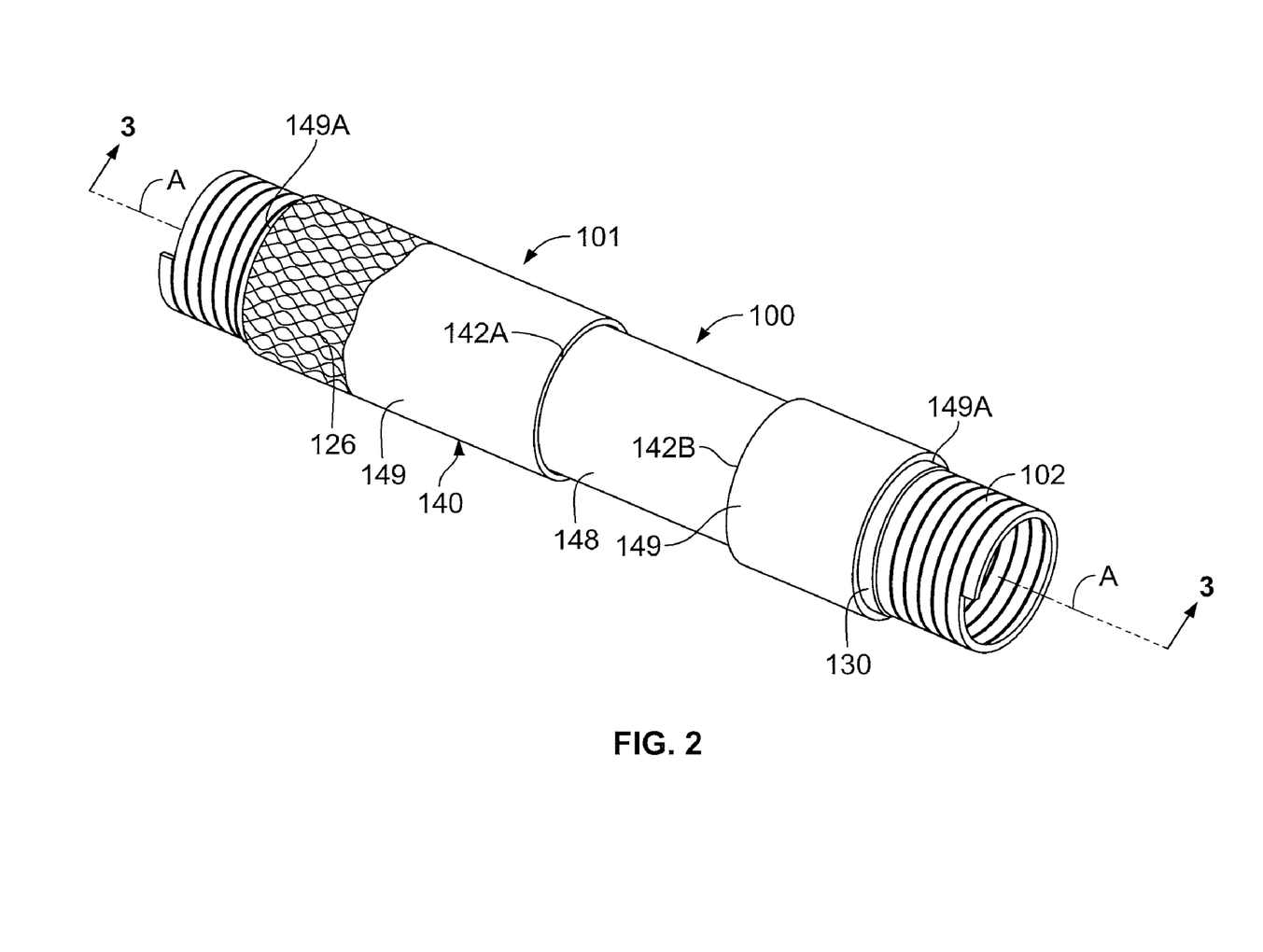
FIG. 2 is a perspective view of a pre-expanded unit including the cover assembly of FIG. 1 and a holdout device according to some embodiments of the present invention.
Figure 3:
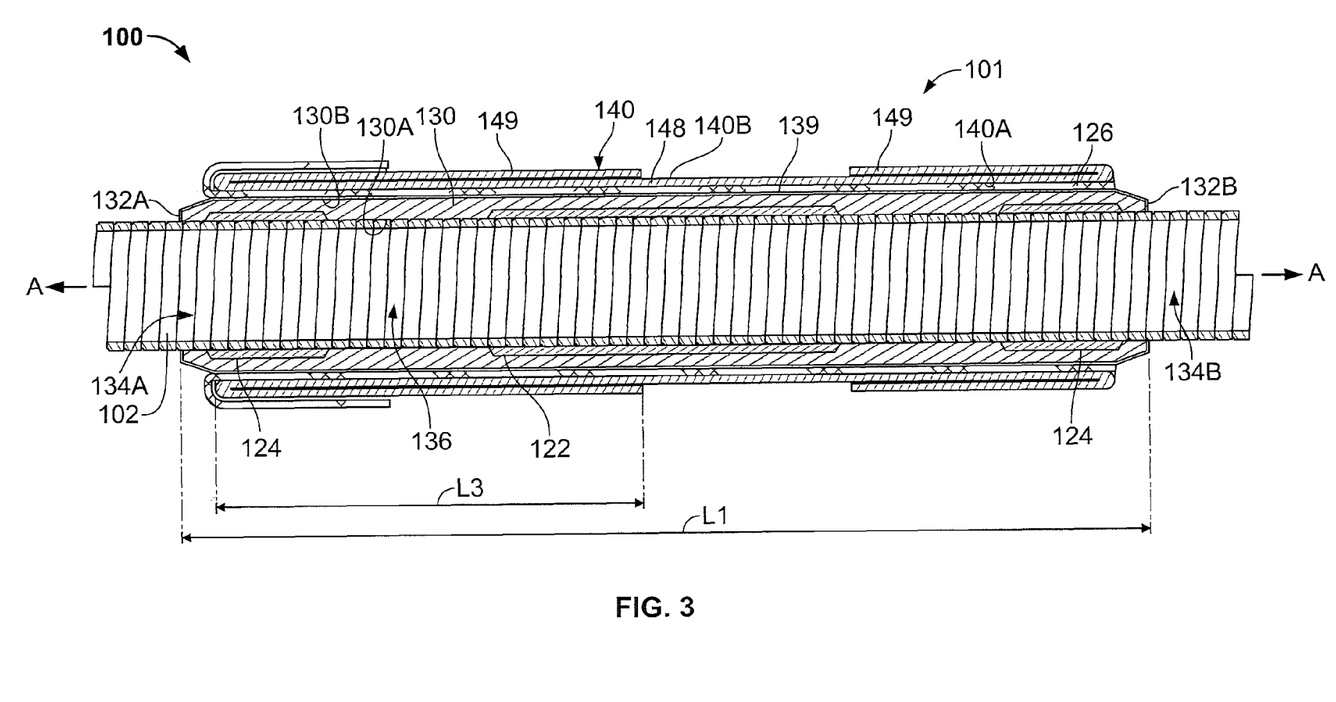
FIG. 3 is a cross-sectional view of the pre-expanded unit of FIG. 2 taken along the line 3-3 of FIG. 2.

With reference to FIGS. 1-3 and 5-7, a disconnectable joint cover assembly 100 (hereinafter, "the cover assembly 100") according to some embodiments of the present invention is shown therein. The cover assembly 100 may be provided as a pre-expanded unit 101 including a holdout device 102, as shown in FIGS. 2 and 3, wherein the cover assembly 100 is in an expanded state or position.

Figure 7:
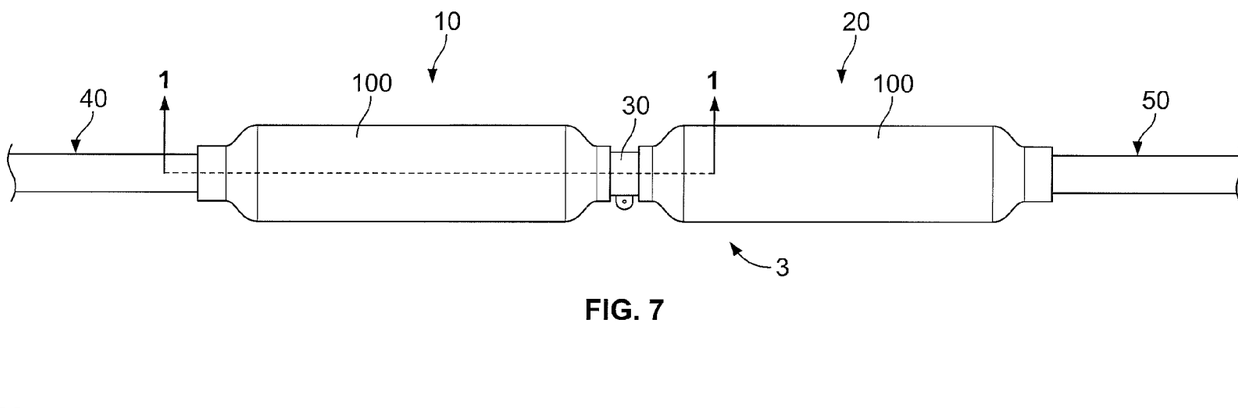
FIG. 7 is a side view of a connection assembly including the disconnectable busbar and two of the disconnectable joint cover assemblies of FIG. 1.

With reference to FIGS. 1 and 5-7, the cover assembly 100 may be used to cover and electrically insulate a disconnectable joint 5 between a terminated cable assembly including a power cable 40 and a termination connector or lug 60 and a disconnectable busbar 30 to form a protected disconnectable joint assembly 10 as shown in FIGS. 1 and 7. A further terminated cable assembly including a cable 50 and a termination connector or lug 70 may be connected to the busbar 30 at a further location and covered by a further cover assembly 100 to form a second protected disconnectable joint assembly 20 (FIG. 7). The busbar 30 and the protected disconnectable joint assemblies 10, 20 collectively form a connection assembly 3 (FIG. 7). According to some embodiments, the cables 40, 50 are concentric neutral cables.

The cover assembly 100 may be deployed and mounted on the intended substrates in a retracted state or position as shown in FIGS. 1 and 7 and discussed in more detail below. According to some embodiments, the cover assembly 100 is a cold shrink cover, meaning that it can be shrunk or retracted about the substrate without requiring the use of applied heat.

The cover assembly 100 includes a Faraday cage layer 122, stress cone layers 124, an inner sleeve (or insulation sleeve body) 130, a semiconductor layer 139, an outer sleeve (or insulating jacket sleeve) 140, and a metal shield mesh layer

126. Referring to FIGS. 2 and 3, the cover assembly 100 has a lengthwise axis A-A. The Faraday cage layer 122, the stress cone layers 124, the inner sleeve 130, the semiconductor layer 139, the outer sleeve 140, and the metal shield mesh layer 126 are provided as an integral, unitary structure extending lengthwise along the axis A-A. According to some embodiments, the cover assembly 100 is provided pre-installed and pre-expanded on the holdout 102.

The inner sleeve 130 has opposed inner and outer surfaces 130A and 130B, and opposed ends 132A, 132B. The inner sleeve 130 is tubular and defines an axially extending conductor through passage 136 that communicates with opposed end openings 134A, 134B.

The Faraday cage layer 122 is illustrated as a generally tubular sleeve bonded to the inner surface 130A of the inner sleeve 130. The Faraday cage layer 122 may be formed of a suitable elastically conductive elastomer. In use, the Faraday cage layer 122 may form a Faraday cage to provide an equal potential volume about the connector 60, 70 so that an electric field is cancelled in the surrounding air voids.

The stress cone layers 124 are illustrated as generally tubular sleeves bonded to the inner surface 130A of the inner sleeve 130 at either end 132A, 132B thereof. The stress cone layers 124 may be formed of a suitable electrically conductive elastomer. In use, the stress cone layers 124 may serve to redistribute the voltage along the surface of the cable insulation 44, 54 to reduce or prevent the degradation of the insulation 44, 54 that might otherwise occur.

According to some embodiments, the Faraday cage layer 122 and the stress cone layers 124 are formed of a material having a Modulus at 100 percent elongation (M100) in the range of from about 0.7 to 1.1 MPa.

The semiconductor layer 139 fully circumferentially surrounds the inner sleeve 130. According to some embodiments, the semiconductor layer 139 is coextensive with the inner sleeve 130.

The shield mesh layer 126 fully circumferentially surrounds the inner sleeve 130. According to some embodiments, the shield mesh layer 126 includes an end section on one end that extends beyond the adjacent end of the inner sleeve 130 but does not extend as far out as the outer sleeve 140. The shield mesh layer 126 may be formed of braided or woven copper filaments, for example.

The outer sleeve 140 has opposed inner and outer surfaces 140A and 140B (FIG. 3), and opposed ends 142A, 142B (FIG. 2). The inner sleeve 140 is tubular and defines an axially extending conductor through passage that communicates with opposed end openings 144A, 144B. When mounted on the holdout 102 as shown in FIGS. 2 and 3, outer sections 149 of the outer sleeve 140 are folded back on an intermediate section 148 of the outer sleeve 140 at annular folds 149A.

The semiconductor layer 139 can be formed of any suitable electrically semiconductive material. According to some embodiments, the semiconductor layer 139 has a Modulus at 100 percent elongation (M100) in the range of from about 0.7 to 1.1 MPa. According to some embodiments, the semiconductor layer 139 is formed of an elastically expandable material. According to some embodiments, the semiconductor layer 139 is formed of an elastomeric material. According to some embodiments, the semiconductor layer 139 is formed of carbon black and silicone. Other suitable materials may include carbon black and EPDM.

The inner sleeve 130 can be formed of any suitable material elastically expandable, dielectric or electrically insulative material. According to some embodiments, the inner sleeve 130 has a Modulus at 100 percent elongation (M100) in the range of from about 0.4 to 0.7 MPa. According to some embodiments, the inner sleeve 130 has an M100 in the range of from about 0.5 to 0.6 MPa. According to some embodiments, the inner sleeve 130 has an elongation at break of at least 400 percent, measured according to ASTM Standard D412-06. According to some embodiments, the inner sleeve 130 is formed of an elastomeric material. According to some embodiments, the inner sleeve 130 is formed of liquid silicone rubber (LSR). Other suitable materials may include formulations of EPDM or ethylene propylene rubber (EPR) having an M100 in the prescribed range.

According to some embodiments, the thickness of the inner sleeve 130 is in the range from about 6 to 10 mm. According to some embodiments, the length L1 (FIG. 3) of the inner sleeve 130 is in the range from about 8 to 30 inches.

The outer sleeve 140 can be formed of any suitable material. According to some embodiments, the outer sleeve 140 is formed of an electrically insulative material. According to some embodiments, the outer sleeve 140 is formed of an elastically expandable material. According to some embodiments, the outer sleeve 140 is formed of an elastomeric material. According to some embodiments, the outer sleeve 140 is formed of ethylene propylene diene monomer (EPDM) rubber. Other suitable materials may include neoprene or other rubber. According to some embodiments, the outer sleeve 140 has a Modulus at 100 percent elongation (M100) in the range of from about 0.6 to 1.5 MPa.

According to some embodiments, the thickness of the outer sleeve 140 is in the range of from about 0.11 to 0.25 inch. According to some embodiments, the length of the outer sleeve 140 is in the range of from about 15 to 40 inches. According to some embodiments, the length L3 (FIG. 3) of the outer section 149 of the outer sleeve 140 adjacent the end 132A is in the range of from about 10 to 25 percent of the length of the main body section 148.

The holdout 102 can be formed of any suitable material. According to some embodiments, the holdout 102 is formed of a rigid cardboard or plastic. According to some embodiments, the holdout 102 includes a strip helically wound to form a rigid cylinder as illustrated, for example. The holdout device 102 may be factory installed. In some embodiments, the cover assembly 100 may instead be pre-expanded in the field using a suitable expansion tool.

The cover assembly 100 may be formed by any suitable method and apparatus. According to some embodiments, the inner sleeve 130 is molded and the outer sleeve 140 is thereafter insert overmolded about the inner sleeve 130 with the shield mesh layer 126 interposed therebetween. The semiconductor layer 139 may be sprayed on.

According to further embodiments, the inner sleeve 130 and the outer sleeve 140 are separately formed (for example, by molding or extrusion) and thereafter the outer sleeve 140 is mounted on the inner sleeve 130.

According to some embodiments, the inner sleeve 130 is unitarily molded. According to some embodiments, the outer sleeve 140 is unitarily molded.

Alternatively, one or more of the inner sleeve 130 and the outer sleeve 140 may be extruded. According to some embodiments, one or both of these components is unitarily extruded.

According to some embodiments, the cables 40, 50 are low-voltage or medium-voltage (e.g., between about 5 and 46 kV) power transmission cables.

Figure 4:
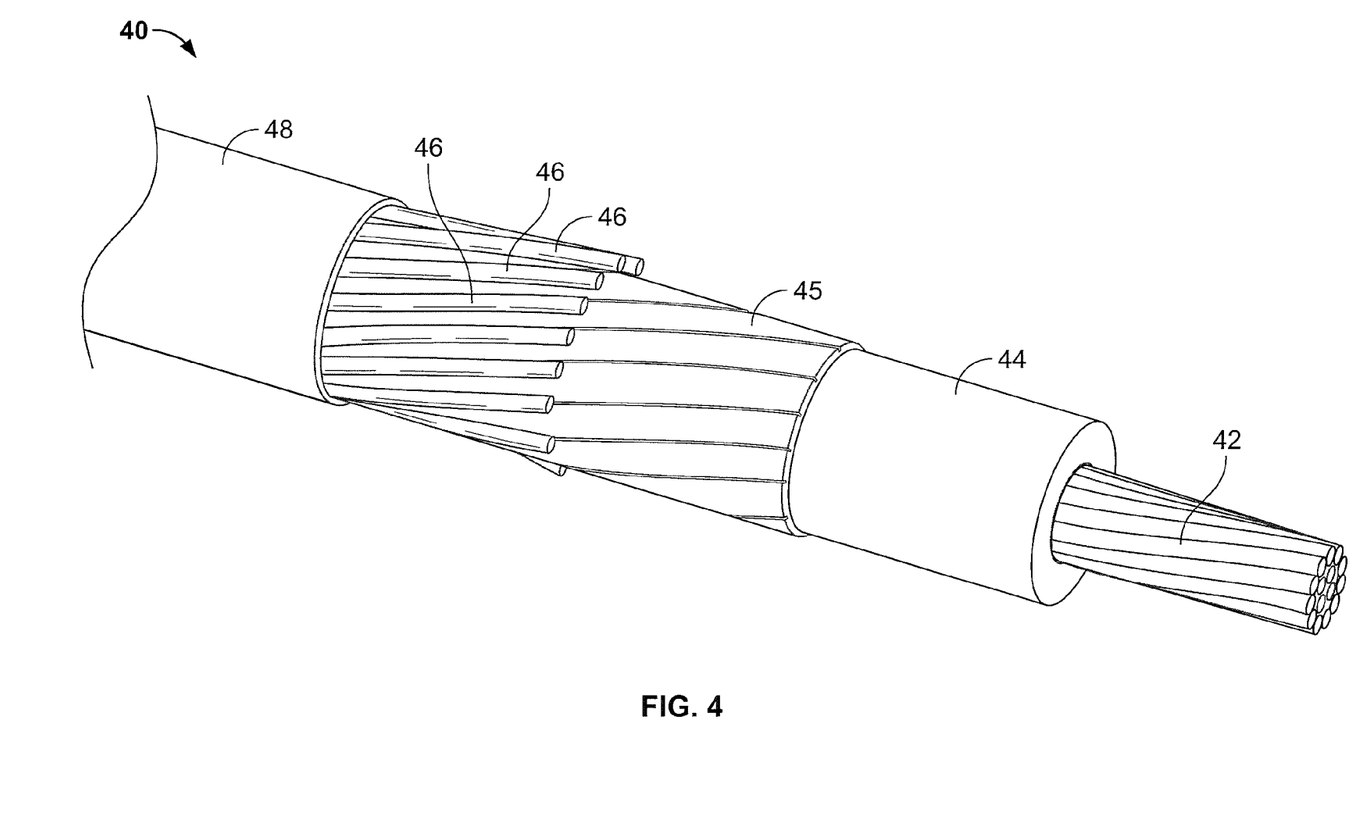
FIG. 4 is a perspective view of an exemplary concentric neutral cable.

As shown in FIG. 4, the cable 40 includes a primary electrical conductor 42, a polymeric insulation layer 44, a semiconductor layer 45, one or more neutral conductors 46, and a jacket 48, with each component being concentrically surrounded by the next. According to some embodiments and as shown, the neutral conductors 46 are individual wires, which may be helically wound about the semiconductor layer 45. The primary conductor 42 may be formed of any suitable electrically conductive materials such as copper (solid or stranded). The polymeric insulation layer 44 may be formed of any suitable electrically insulative material such as crosslinked polyethylene (XLPE) or ethylene propylene rubber (EPR). The semiconductor layer 45 may be formed of any suitable semiconductor material such as carbon black with polyethylene. The neutral conductors 46 may be formed of any suitable material such as copper. The jacket 48 may be formed of any suitable material such as EPDM. The cable 50 (FIG. 5) is similarly constructed with a primary electrical conductor 52, a polymeric insulation layer 54, a semiconductor layer 55, one or more neutral conductors 56, and a jacket 58 corresponding to components 42, 44, 45, 46 and 48, respectively.

The cable connector 60 may be formed of any suitable electrically conductive metal such as copper. The connector 60 includes a body 64 and a coupling portion or lug 62 extending from an end thereof. A bolt bore 62A is defined in the lug 62. A conductor bore 64A is defined in the body to receive the exposed end section of the conductor 42. Fasteners 65 secure the conductor 42 in the bore 64A. The cable connector 70 may be constructed in the same manner as the connector 60 and have a lug 72 with a bolt bore.

The busbar 30 may be referred to as an in-line busbar and includes an electrically conductive busbar body 32 and a pair of electrically conductive coupling portions or lugs 34, 35 extending from opposed sides of the busbar body 32. The busbar body 32 and lugs 34, 35 may be integrally formed (e.g., cast or machined) of a suitable metal such as copper or aluminum. A threaded bore 34A is defined in each lug 34, 35. An electrically conductive grounding eyelet 33 also extends from the body 32. An insulation layer 36 surrounds the busbar body 32 such that the lugs 34, 35 and the eyelet 33 remain exposed. The insulation layer 36 may be formed of a suitable electrically insulating elastomer such as EPDM. A semiconductor layer 38 surrounds a mid-portion of the insulation layer 36. The semiconductor layer 38 may be formed of any suitable semiconductor material such as carbon black with silicone rubber or EPDM.

Referring now to FIGS. 1 and 5-7, the protected disconnectable joint assembly 10 (FIG. 1) may be constructed in the following manner using the pre-expanded unit 101. The protected disconnectable joint assembly 20 may also be formed using a second-pre-expanded unit 101 to construct the connection assembly 3.

Figure 5:
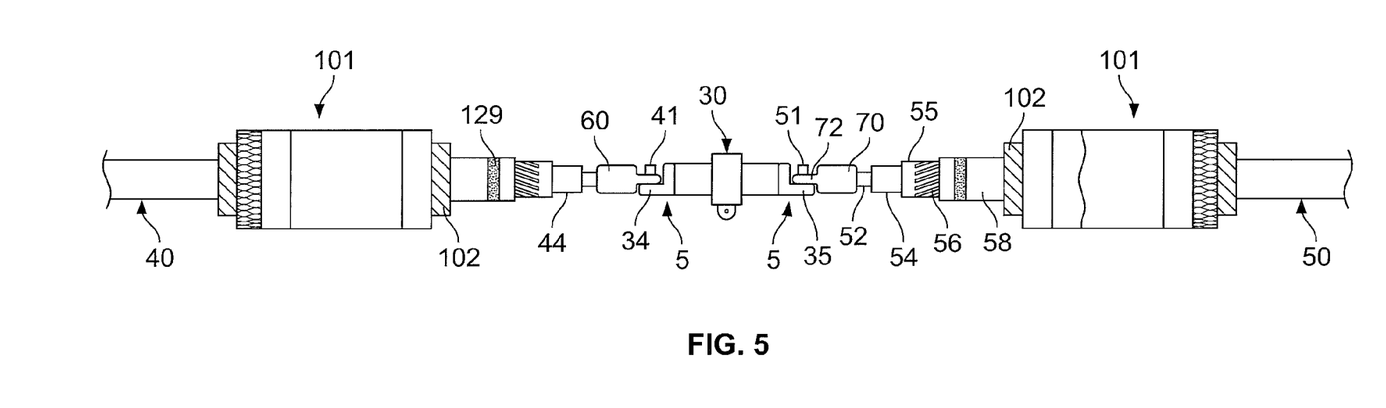
FIGS. 5 and 6 are side views illustrating procedures for installing the cover assembly of FIG. 1 on a disconnectable joint.
Figure 6:
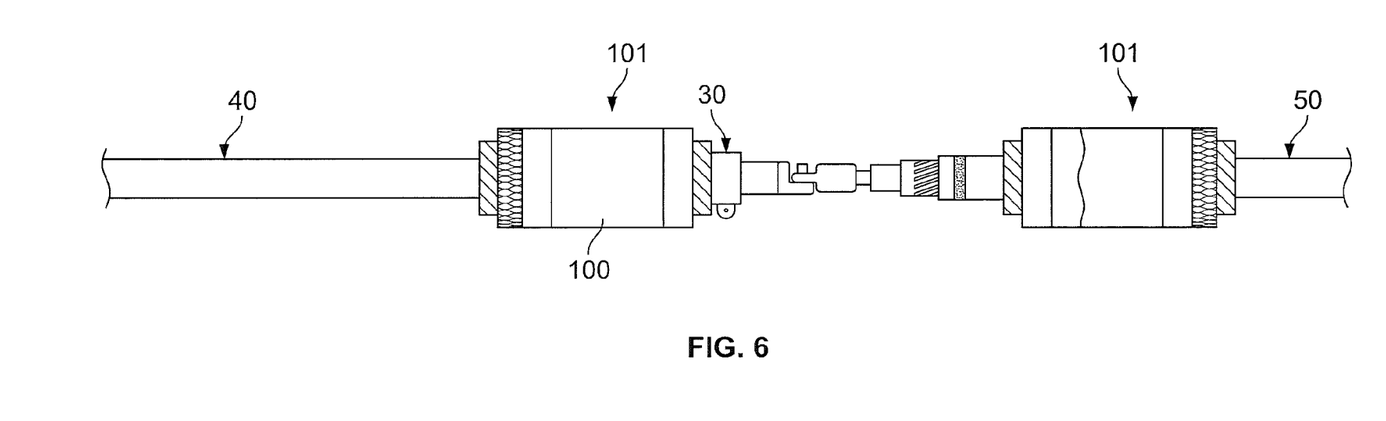

The cables 40, 50 are prepared as shown in FIG. 5 such that a segment of each cable layer extends beyond the next overlying layer.

A first pre-expanded unit 101 is slid over the cable 40 and a second pre-expanded unit 101 is slid over the cable 50 as shown in FIG. 5. According to some embodiments, the inside diameter of the holdout 102 is greater than the outer diameter of each cable 40, 50 such that the inner diameter of the holdout 102 is sufficient to receive the prepared cable 40, 50 the connectors 60, 70 and the busbar 30 without undue effort. According to some embodiments, the inner diameter of the holdout 102 is at least as great as the outer diameter of the largest portion of the cables, connectors or busbar that are to be received in the passage 136. The pre-expanded units 101 may be retained or parked on the cables 40, 50 until the operator is ready to install the cover assemblies 100 on the cables 40, 50.

The end of the cable conductor 42 is inserted into the bore 64A of the connector 60 and secured by the fastener 65. The end of the cable conductor 52 is similarly secured to the connector 70.

The lug 62 of the connector 60 is mated to the busbar lug 34 and secured in place by a removable threaded bolt 41, which extends through the bores 62A and 34A to form a first joint assembly 12. On the opposite side of the busbar 30, the lug 72 of the connector 70 is likewise secured to the busbar lug 35 by a removable threaded bolt 51 to form a second joint assembly 22.

The pre-expanded unit 101 parked on the cable 40 is then slid into position over the connector 60. The holdout 102 is then removed from the cover assembly 100, thereby permitting the elastomeric sleeves 130, 140 to relax and radially retract about the cables 40, 50 and the connector 60. According to some embodiments, the inner sleeve 130 overlaps and engages the semiconductor layer 44 of the cable 40 and the semiconductor layer 38 of the busbar 30.

According to some embodiments, a partial portion of the holdout 102 is removed to permit a lead portion of the inner sleeve 130 adjacent the busbar 30 to contract onto the busbar 30. The sleeve 130 (still primarily supported by the holdout 102) is slid or pushed axially toward the center of the busbar 30 until the end 132B of the inner sleeve 130 abuts a radially outwardly extended or enlarged ledge or portion 38A (FIG. 1) of the busbar semiconductor layer 38. The remainder of the holdout 102 is thereafter removed to permit the remainder of the cover assembly 100 to contract about the first joint assembly 12. This procedure may help to ensure that the cover assembly 100, once installed, is properly axially registered with the cable 40, connector 60 and busbar 30. A silicone grease may be pre-applied to the busbar 30 to facilitate the step of sliding the end of the sleeve 130 over the busbar 30.

The shield mesh 126 is then rolled outwardly onto the semiconductor layer 45 as shown in FIG. 1. A retainer such as a clamp 127 (FIG. 1) may be secured about the cable 40 to secure the shield mesh 126 in contact with the neutral conductors 46. Tape (not shown; e.g., vinyl tape) may be wrapped around the neutral conductors 46 and the shield mesh 126 to protect the outer sleeve 140.

A strip of flowable sealant 129 is applied to the outer surface of the cable jacket 48. The flowable sealant may be a mastic, for example. The operator then rolls the extension section 149 adjacent the end 132A axially outwardly to cover the adjacent section of the cable 40. According to some embodiments, at least a portion of the section 149 overlaps the cable jacket 48 and engages the sealant strip 64 to provide a moisture seal. According to some embodiments, the length of overlap between the extension section 149 and the cable jacket 48 is at least 5 inches.

The operator likewise rolls the extension section 149 adjacent the end 132B axially outwardly to cover a portion of the semiconductor layer 38 of the busbar 30.

The relaxed inner diameter of the outer sleeve 140 is less than at least the outer diameter of the jacket layer 48 and the outer diameter of the semiconductor layer 38. Therefore, the outer sleeve 140 exerts a persistent radially inwardly compressive or clamping force or pressure (due to elastic tension) onto the cable 40 and the busbar 30. The outer sleeve 140 thereby effects a liquid tight seal at the interface between the cable jacket 48 and the outer sleeve 140 and between the busbar 30 and the outer sleeve 140. This seal can protect the cable and the joint connection from the ingress of environmental moisture. According to some embodiments the relaxed inner diameter of the outer sleeve 140 is at least 30 percent less than the smallest diameter cable upon which the cover assembly 100 is intended to be installed.

The relaxed inner diameter of the inner sleeve 130 is less than the outer diameter of the cable semiconductor layer 45 and the busbar insulation 36 so that the inner sleeve 130 exerts a persistent radially compressive force on each. The inner sleeve 130 may thereby effect a liquid tight seal at the interfaces between the inner sleeve 130 and the semiconductor layer 45 and between the inner sleeve 130 and the busbar insulation 36. The inner sleeve 130 may also conform to and apply a persistent radially compressive load on the cable connector 60. According to some embodiments, the relaxed inner diameter of the inner sleeve 130 is at least 20 percent less than the outer diameter of the semiconductor layer 45 of the smallest diameter cable upon which the cover assembly 100 is intended to be installed and, according to some embodiments, between about 20 and 80 percent less.

According to some embodiments, the inner sleeve 130 axially overlaps the cable semiconductor layer 45 by at least 0.5 inch and, according to some embodiments, by between about 0.5 and 1.5 inches. According to some embodiments, the inner sleeve 130 axially overlaps the busbar insulation 36 by at least 2 inches and, according to some embodiments, by between about 2 and 5 inches.

According to some embodiments, the outer sleeve 140 axially overlaps the cable jacket 48 by at least 5 inches and, according to some embodiments, by between about 5 and 8 inches. According to some embodiments, the outer sleeve axially overlaps the busbar insulation 36 by at least 1 inch and, according to some embodiments, by between about 1 and 3 inches.

The second cover assembly 100 on the cable 50 can be installed in the same manner as described above for the first cover assembly 100 on the cable 40 to complete the connection assembly 3, as shown in FIG. 7.

According to some embodiments, the busbar 30, bolts 41, 51, connectors 60, 70 and cover assemblies 100 (one for each lug 34 of the busbar 30) are provided as a pre-associated or matched kit. According to some embodiments, the foregoing components of the kit are packaged together.

Covering kits and methods of the present invention and as described herein can provide a number of advantages.

The high elasticity of the inner sleeve 130 (e.g., silicone rubber sleeve) enables the inner sleeve 130 to move with the cable 40 and not lose its seal when the cover is bent. The coldshrink inner sleeve 130 provides a high compressive force that continuously grips the cable 40 to likewise maintain the seal even when the cable 40 is bent. The cover assembly 100 can also be physically more compact than push-on EPDM disconnectable joint covers. The inner sleeve 130 shrinks down tight and form fitting on the cable and joint connection to thereby minimize the volume of air trapped inside the joint sleeve as compared to push-on EPDM sleeves. This may be particularly important in congested urban networks where disconnectable joints are most common. A coldshrink joint cover assembly 100 can be designed to operatively fit a wider range of cable sizes, reducing the number of kit sizes that must be provided to fit a full range of cable sizes.

The cover assembly 100 can also be conveniently removed when it is desired to disconnect the cable 40 from the busbar 30. According to some embodiments, the cover assembly 100 is removed by cutting the sleeve 140 and the sleeve 130. When the inner sleeve 130 is formed of silicone rubber, the silicone rubber sleeve under tension will typically split open and peel off quickly when a knife cut is made. After the joint is reconnected, a new cover assembly 100 can be installed in the same manner as described herein.

According to some embodiments, the cover assembly 100 provides an "all-in-one" integral unit. The cover assembly 100 including the inner sleeve 130, the outer sleeve 140, and the shield mesh 126 can be preassembled at a factory.

Cover assemblies according to some embodiments of the present invention may include additional layers and/or certain layers may be omitted. One or more additional layers may be interposed between the inner sleeve 130 and the outer sleeve 140.

Cover assemblies according to embodiments of the invention may be used for any suitable cables and connections. Such cable assemblies may be adapted for use, for example, with connections of medium voltage cables up to about 46 kV.

Figure 8:
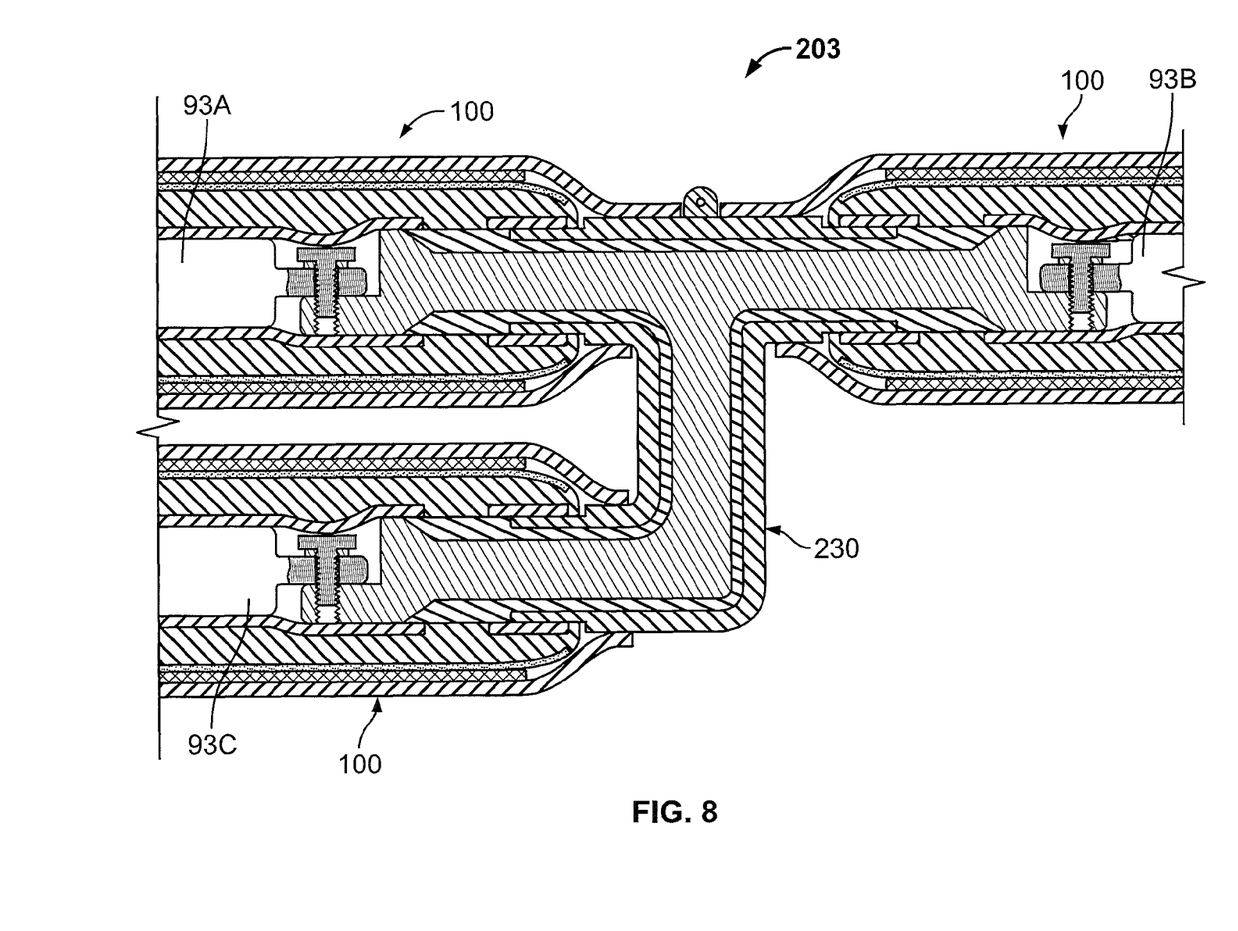
FIG. 8 is a cross-sectional view of a protected disconnectable joint assembly including a Y-shaped busbar.

With reference to FIG. 8, a connection assembly 203 according to further embodiments of the invention is shown therein. The connection assembly 203 differs from the connection assembly 3 in that the busbar 230 thereof is a Y-shaped busbar configured to simultaneously form disconnectable joints with three different cables 93A, 93B, 93C. Cover assemblies 100 are installed on each of the joints as discussed above. Further embodiments of the invention may employ busbars configured for more than three disconnectable joints, such as H-shaped busbars.

Figure 9:
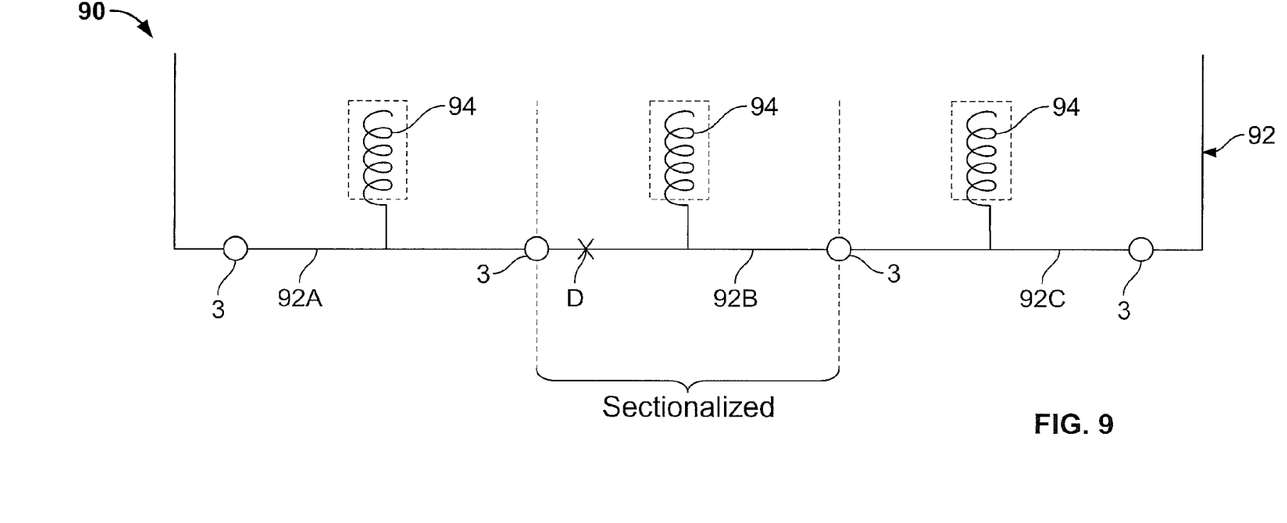
FIG. 9 is a schematic diagram illustrating an electrical power grid including the connection assembly of FIG. 7.

With references to FIG. 9, an electrical power network or grid 90 including a pair of the connection assemblies 3 of FIG. 7 is shown schematically therein. The network 90 includes a feeder line 92, which may be a medium voltage feeder line (e.g., 25 kV) feeding a secondary power grid (e.g., 600V) via transformers. The feeder line 92 may have a series of power loads 94 distributed therealong. The connection assemblies 3 are provided at spaced apart locations along the feeder line 92 to divide the feeder line 92 into respective cable segments 92A, 92B and 92C.

In the event of a defect D in the feeder line 92 (e.g., a phase to ground fault or failed splice), the feeder line 92 can be sectionalized to isolate the segment or section 92B requiring repair while maintaining the remainder of the feeder line 92 in service. The section 92B can be sectionalized by removing the cover assemblies 100 on either end of the cable segment 92B, disconnecting the ends of the cable section 92B from the disconnection joints, and removing the cable segment 92B from the network to be repaired or replaced. In some cases, the cable segment 92B is removed from an underground chamber (e.g., manhole) housing the feeder line 92.

It may be especially important to disconnect and reconnect the cable segment 92B (or a new cable segment) quickly. Typically, some or all of the load previously handled by the cable segment 92B is redirected to other feeder cable segments, which may tend to overheat and risk inducing a cascade failures if the cable segment 92B is not reconnected expeditiously.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

The invention claimed is:

1. A method for forming a protected disconnectable joint assembly, the method comprising:
  providing a disconnectable joint assembly including:
    an electrical transmission power cable including a conductor and a cable insulation layer covering the conductor, the conductor having a terminal end;
    an electrically conductive cable connector affixed to the terminal end of the power cable and having a connector coupling portion;
    a busbar including an electrically conductive busbar body, a busbar coupling portion extending from the busbar body, and a busbar insulation layer covering the busbar body; and
    a disconnectable coupling mechanism mechanically securing the cable coupling portion to the busbar coupling portion to provide a joint between the cable and the busbar, wherein the disconnectable coupling mechanism is selectively operable to disconnect the cable connector from the busbar without severing the cable;
  providing a joint cover assembly including a tubular, elastomeric cold-shrinkable sleeve body;
  maintaining the joint cover assembly in an expanded state using a removable holdout device mounted within the sleeve body;
  mounting the joint cover assembly on the holdout over the joint between the cable and the busbar; and thereafter
  removing the holdout device from the joint cover assembly to release the sleeve body to contract onto the disconnectable joint assembly such that the sleeve body circumferentially surrounds the joint between the cable and the busbar, overlaps portions of the cable insulation layer and the busbar insulation layer adjacent the joint, and applies a persistent radially compressive load on the cable insulation layer and the busbar insulation layer.

2. The method of claim 1 wherein the sleeve body has a Modulus at 100 percent elongation (M100) in the range of from about 0.4 to 0.7 MPa.

3. The method of claim 2 wherein the sleeve body has an elongation at break of at least 400 percent.

4. The method of claim 2 wherein the sleeve body is formed of silicone rubber.

5. The method of claim 1 wherein the sleeve body directly engages the portions of the cable insulation layer and the busbar insulation layer adjacent the joint when mounted on the disconnectable joint assembly.

6. The method of claim 1 wherein the joint cover assembly includes a semiconductor layer mounted on an outer side of the sleeve body and formed of an electrically conductive elastomer.

7. The method of claim 1 wherein the joint cover assembly includes at least one of:
  a Faraday cage sleeve mounted within the sleeve body and formed of an electrically conductive elastomer; and
  a stress cone sleeve mounted within the sleeve body proximate an end thereof, wherein the stress cone sleeve is formed of an electrically conductive elastomer.

8. The method of claim 1 wherein the joint cover assembly includes an electrically insulating jacket sleeve circumferentially surrounding the sleeve body.

9. The method of claim 8 wherein the jacket sleeve is formed of EPDM rubber.

10. The method of claim 8 wherein the method includes mounting the joint cover assembly on the disconnectable joint assembly such that first and second opposed extension sections of the jacket sleeve extend lengthwise beyond the sleeve body and engage further portions of the cable insulation layer and the busbar insulation layer, respectively.

11. The method of claim 10 wherein the first extension section is longer than the second extension section.

12. The method of claim 1 wherein mounting the joint cover assembly on the cable and the busbar includes mounting the joint cover assembly on the cable and the busbar such that the sleeve body circumferentially conforms to and applies a persistent radially compressive load on the cable connector.

13. The method of claim 1 wherein the disconnectable coupling mechanism includes a connector bolt hole defined in the connector coupling portion, a busbar bolt hole defined in the busbar coupling portion, and a removable bolt extending through the connector bolt hole and the busbar bolt hole.

14. The method of claim 1 further including:
  cutting and removing the sleeve body from the disconnectable joint assembly; and thereafter
  disconnecting the cable connector from the busbar using the disconnectable coupling mechanism and without severing the cable.

15. The method of claim 1 wherein:
  the busbar includes a plurality of busbar coupling portions integral with and distributed about the busbar body; and
  each of the plurality of busbar coupling portions is disconnectably coupled by a respective disconnectable coupling mechanism with a respective one of a plurality of cable connectors, each of which is associated with a respective one of a plurality of power cables, to form a respective joint therebetween; and
  the method includes:
    providing a plurality of the joint cover assemblies; and
    mounting each of the plurality of joint cover assemblies on the disconnectable joint assembly such that the sleeve body thereof circumferentially surrounds a respective one of the joints, overlaps portions of the corresponding cable insulation layer and the corresponding busbar insulation layer adjacent the joint, and applies a persistent radially compressive load on the corresponding cable insulation layer and the corresponding busbar insulation layer.

16. The method of claim 15 wherein the plurality of busbar coupling portions includes at least three busbar coupling portions.

17. The method of claim 1 wherein:
  the sleeve body is formed of silicone rubber;
  the sleeve body directly engages the portions of the cable insulation layer and the busbar insulation layer adjacent the joint when mounted on the disconnectable joint assembly;
  the joint cover assembly includes a semiconductor layer mounted on an outer side of the sleeve body and formed of an electrically conductive elastomer;
  the joint cover assembly includes a Faraday cage sleeve mounted within the sleeve body and formed of an electrically conductive elastomer;
  the joint cover assembly includes a stress cone sleeve mounted within the sleeve body proximate an end thereof, wherein the stress cone sleeve is formed of an electrically conductive elastomer;
  the joint cover assembly includes an electrically insulating jacket sleeve circumferentially surrounding the sleeve body and formed of EPDM rubber;
  the joint cover assembly further includes an electrically conductive neutral bridge member to electrically connect to and provide continuity between a ground conductor of the cable and the semiconductor layer on the outer side of the sleeve body;

the disconnectable coupling mechanism includes a connector bolt hole defined in the connector coupling portion, a busbar bolt hole defined in the busbar coupling portion, and a removable bolt extending through the connector bolt hole and the busbar bolt hole; and mounting the joint cover assembly on the cable and the busbar includes mounting the joint cover assembly on the cable and the busbar such that the sleeve body circumferentially conforms to the cable connector; and the method includes:
- mounting the joint cover assembly on the disconnectable joint assembly such that first and second opposed extension sections of the jacket sleeve extend lengthwise beyond the sleeve body and engage further portions of the cable insulation layer and the busbar insulation layer, respectively;
- maintaining the joint cover assembly in an expanded state using a removable holdout device mounted within the sleeve body;
- mounting the joint cover assembly on the holdout over the joint between the cable and the busbar and the adjacent portions of the cable insulation layer and the busbar insulation layer; and thereafter
- removing the holdout device from the joint cover assembly to release the sleeve body to contract onto the joint between the cable and the busbar and the adjacent portions of the cable insulation layer and the busbar insulation layer.

18. A system to form a protected disconnectable joint assembly using an electrical transmission power cable including a conductor and a cable insulation layer covering the conductor, the conductor having a terminal end, and an electrically conductive cable connector affixed to the terminal end of the power cable and having a connector coupling portion, the system comprising:
- a busbar including an electrically conductive busbar body, a busbar coupling portion extending from the busbar body, and a busbar insulation layer covering the busbar body; and
- a disconnectable coupling mechanism to mechanically secure the cable coupling portion to the busbar coupling portion to provide a joint between the cable and the busbar and thereby form a disconnectable joint assembly, wherein the disconnectable coupling mechanism is selectively operable to disconnect the cable connector from the busbar without severing the cable;
- a joint cover assembly including a tubular, elastomeric cold-shrinkable sleeve body, wherein the joint cover assembly is configured to be mounted on the disconnectable joint assembly such that the sleeve body circumferentially surrounds the joint between the cable and the busbar, overlaps portions of the cable insulation layer and the busbar insulation layer adjacent the joint, and applies a persistent radially compressive load on the cable insulation layer and the busbar insulation layer; and
- a removable holdout mounted within the sleeve body, wherein the holdout maintains the joint cover assembly in an expanded state and, when removed, permits the sleeve body to contract to a contracted state about the joint.

19. The system of claim 18 wherein the joint cover assembly and the busbar are provided as a kit.

20. A method for forming a protected disconnectable joint assembly, the method comprising:
- providing a disconnectable joint assembly including:
  - an electrical transmission power cable including a conductor and a cable insulation layer covering the conductor, the conductor having a terminal end;
  - an electrically conductive cable connector affixed to the terminal end of the power cable and having a connector coupling portion;
  - a busbar including an electrically conductive busbar body, a busbar coupling portion extending from the busbar body, and a busbar insulation layer covering the busbar body; and
  - a disconnectable coupling mechanism mechanically securing the cable coupling portion to the busbar coupling portion to provide a joint between the cable and the busbar, wherein the disconnectable coupling mechanism is selectively operable to disconnect the cable connector from the busbar without severing the cable;
- providing a joint cover assembly including a tubular, elastomeric cold-shrinkable sleeve body having a Modulus at 100 percent elongation (M100) in the range of from about 0.4 to 0.7 MPa; and
- mounting the joint cover assembly on the disconnectable joint assembly, including mounting the sleeve body on the cable and the busbar such that the sleeve body circumferentially surrounds the joint between the cable and the busbar, overlaps portions of the cable insulation layer and the busbar insulation layer adjacent the joint, and applies a persistent radially compressive load on the cable insulation layer and the busbar insulation layer.

* * * * *